United States Patent

[11] 3,601,195

| [72] | Inventor | Charles L. Hearn |
| | | Tulsa, Okla. |
| [21] | Appl. No. | 3,882 |
| [22] | Filed | Jan. 19, 1970 |
| [45] | Patented | Aug. 24, 1971 |
| [73] | Assignee | Cities Service Oil Company |

[54] SELECTIVE PLUGGING BY HOT FLUID INJECTION
6 Claims, 2 Drawing Figs.

[52] U.S. Cl. .................................................. 166/288, 166/294, 166/295
[51] Int. Cl. ................................................... E21b 33/138
[50] Field of Search .......................................... 166/272, 288, 294, 295

[56] References Cited
UNITED STATES PATENTS

| 1,307,027 | 6/1919 | Swan | 166/288 |
| 2,541,688 | 2/1951 | Cardwell | 166/295 |
| 2,779,415 | 1/1957 | Howard | 166/288 X |
| 2,779,416 | 1/1957 | Clark | 166/288 X |
| 2,787,325 | 4/1957 | Holbrook | 166/288 X |
| 2,799,341 | 7/1957 | Maly | 166/288 |
| 2,946,383 | 7/1960 | Bearden et al. | 166/295 |

Primary Examiner—Ian A. Calvert
Attorney—J. Richard Geaman

ABSTRACT: This is a method of controlling selective plugging of a reservoir when it is desired to place a plug some distance into the reservoir. By this method, plugging is accomplished by injecting into a permeable zone a hot fluid which, on cooling, sets up into a gel or solid, or increases greatly in viscosity, thereby effectively plugging the permeable zone. The reservoir is preheated by injecting a hot fluid which does not contain a plugging material. The radial distance of plugging can be controlled by the amount of preheating fluid and plugging agent injected. When the preheating fluid is hot water and the plugging agent is an aqueous solution these amounts can be estimated by simple equations.

CHARLES L. HEARN, INVENTOR.

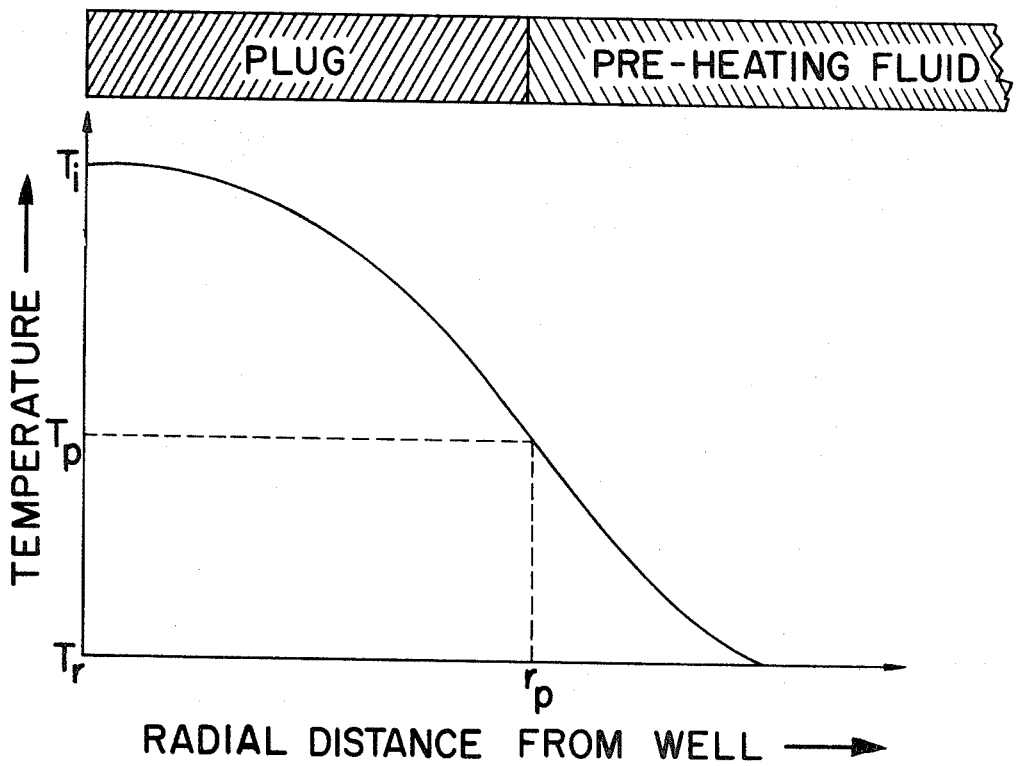
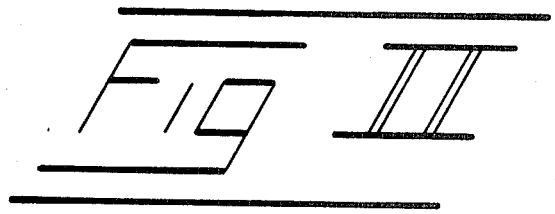

SELECTIVE PLUGGING BY HOT FLUID INJECTION

BACKGROUND OF THE INVENTION

This invention relates to the recover of oil from subterranean reservoirs. More particularly, it relates to the recover of oil from reservoirs which have a high degree of permeability anisotropy whereby the highly permeable streaks are selectively plugged by introduction of a preheating fluid to warm the reservoir to a predetermined temperature followed by the introduction of a plugging material which upon cooling solidifies or becomes viscous and thereby plug the more permeable zones of the reservoir.

Most oil reservoirs consist of layers or strata of permeable rock which contain the reservoir fluid in their interstices. The permeable strata ma be interspersed with impermeable shale zones or highly permeable fractured zones. A common problem encountered during the secondary recover of petroleum is the early breakthrough of the injected fluid at the producing well. This phenomenon is caused by the injected fluid traveling through the more permeable or fractured zones and bypassing less permeable zones which may contain a tremendous amount of reservoir fluid. The reservoir fluid thereby is lost for all intensive purposes. This inefficient displacement of oil, commonly called channeling, may cause a secondary recovery project to be uneconomical even though a large saturation of oil is left in the reservoir.

If the highly permeable strata or fractures are isolated from the adjacent strata by impermeable barriers such as shale streaks, plugging the permeable zones or fractures at the injection well may be an effective way of preventing the channeling and therefore the inefficient displacement process. Plugging immediately adjacent to the injection well bore, however, is relatively simple. It is a mere matter of injecting a plugging material through the well bore and into the permeable strata. However, it may happen that the permeable zone or fracture is not isolated from adjacent permeable strata. In this case, a plug at the injection well bore will not be effective. Crossflow between the layers will allow the injected fluid to bypass the plug and return to the permeable zone, thereby creating a channeling effect and early breakthrough into the production well. Selective plugging under these conditions may result in a small amount of additional oil displaced in the vicinity of the well bore of the injection well. However, after the bypassing occurs, a normal inefficient displacement process will control with the effect of the plug being essentially lost. To overcome this phenomenon of bypassing, as much as possible of the length of the permeable zone between the injection and production wells should be plugged, thereby avoiding the channeling effect and directing the flooding water or flooding driving fluid to to other strata which contain reservoir fluid.

The selective plugging of oil reservoir is old to the art of reservoir mechanics. Many methods of plugging a permeable zone at or near an injection well exist. Some of the methods which have been previously adapted to well bore plugging include cementing, isolating the zone with well bore packers, injection of a material which solidifies or gels in the formation, injection of two chemicals which react to form a precipitate, and various and sundry other well bore plugging techniques. In a few cases, the need for placing the plug at a point in the reservoir a considerable distance from the injection well has been recognized. One of the leading methods involves injecting a material which polymerizes and solidifies in the permeable zone, the polymerization being time dependent so that a sufficient quantity of plugging substance can be injected before solidification occurs. Therefore, one determines the distance from the injection well bore that the impermeable plug is desired, sets the polymerization catalyst to this time, and injects a sufficient amount of plugging material to cover the distance of plugging desired before the plug solidifies. The injection of two chemicals which mix to form a precipitate may also be used to plug a zone a considerable distance away from the well bore. Therefore, by using a sufficiently large spacer plug between the two chemicals, the selective plugging may be determined at any distance desired from the injection well bore. Such plugging methods may or may not be satisfactory in a given reservoir, depending upon the reservoir configuration, reservoir chemical composition and fluid content.

Howard, U.S. Pat. No. 2,779,415, discloses a method by which water and gas zones are plugged by a hot solution of oil-soluble water, insoluble solids, which fill the pores upon cooling. The hot solution should contain sufficient solids so that upon cooling to the formation temperature it becomes supersaturated. Consequently, as described by Howard, part of the solid precipitates from the solution into the pores of the permeable zones to be plugged. The precipitate usually leaves some permeability due to the volume occupied by the solution from which the precipitate has fallen. When the well is produced the oil will flow through the partially plugged oil-producing zones and remove by solvent action the plugging solid from these zones. A similar treatment then substantially completely plugs the non-oil-producing zones, such as those producing water and gas, while the oil-producing zones are cleared of plugging solids when the well is produced. An inherent problem in the method of Howard is that any precipitate dictates that a given volume of the pore space must be occupied by the solution carrying the precipitate; therefore, the precipitate can only partially plug any zone which it contacts, whereby repeated plugging operations are limited to the vicinity of the well bore after the initial plugging method has been initiated.

Irons, U.S. Pat. No. 2,298,129, describes a method by which a fairly low-melting metal is injected in the vicinity of the well bore and thereby cooled to solidify and plug the permeable and fractured zones of the well bore vicinity. The method is not only a method of rendering a permeable zone impermeable, but further solidifies and strengthens the formation in which it is introduced. Such a sealing material is highly insoluble in the well fluids and therefore is a permanent installation. The inherent problem in the method of Irons is that the molten metals must be selectively placed in the permeable zones by packing methods and also are limited to the vicinity of the well bore, or a tremendous amount of preheating must be accomplished since the specific heat and the heat of solidification of the molten metals is very high and demands tremendous heat loss from the formation when it solidifies. Therefore, in practice the method of Irons is only applicable to several feet from the well bore.

Schwabe, et al., U.S. Pat. No. 2,203,881, teaches the solidification of a subsurface strata with sulfur which involves introducing molten sulfur into the strata to suitably case the well. The sulfur, while passing down the well, must be heated in order to maintain a liquid. The teaching of Schwabe is essentially for shallow-depth solidification of soil. Schwabe does teach that preheating loose strata with steam prior to introducing the molten sulfur effectively increases the effective range of the molten sulfur. Schwabe relates the problems of the molten sulfur tending to return to the surface about the well casing in the subsurface solidification processes. Schwabe further presents an apparatus for introducing the molten sulfur into the subsurface strata in which no return of molten sulfur to the surface is allowed. Therefore, the method of Schwabe is essentially an invention for the solidification of sandy or other loose soils at shallow depths to solidify or consolidate the soils for construction purposes. The preheating concept has also been disclosed by Howard, but the overall desirability of preheating a formation before the injection of fluids other than molten metals, precipitating solutions, or molten organic compounds has not been presented nor disclosed. There has not been disclosed any process by which inexpensive plugging agents may be introduced into the permeable zones or fractures of an oil reservoir so that selective plugging at considerable distance may be enhanced so as to completely divert all injection fluids to the more impermeable strata of the reservoir and thereby create a greater vertical sweep efficiency and greater contact of the reservoir fluids contained therein.

It is an object of this invention to provide an improved method for the secondary recovery of oil from subterranean reservoirs.

It is another object of this invention to provide a method by which permeable zones and fractures of the reservoir may be selectively plugged a considerable distance from the injection well.

It is still another object of this invention to provide a method by which the permeable zones and fractures of the oil reservoir may be selectively plugged so that the driving fluid or injection fluid further introduced into the reservoir will be diverted from the permeable and fractured zones and thereby contact the less permeable regions of the reservoir and the reservoir fluid contained therein.

It is still a further object of the present invention to provide a method of preheating the permeable and fractured zones of the reservoir so that a hot selective plugging agent may be introduced into these high-permeability regions and carried a substantial distance from the injection well before solidifying or becoming viscous and selectively plugging these regions. 0.2

With these and other objects in mind the present invention is hereinafter set forth with reference to the following drawings and description:

SUMMARY OF THE INVENTION

The objects of the present invention are accomplished by a method of selectively plugging a permeable zone of a formation penetrated by a oil well. The method comprises injecting into a formation, at a temperature above that of said formation, a liquid plugging agent which is normally a solid or semisolid at the formation temperature. The improvement comprises preheating the permeable zone of the formation to be selectively plugged with a preheating fluid which is miscible with the liquid plugging agent. The preheating of the formation may be accomplished by introducing a preheating fluid having a temperature greater than that of the formation prior to the introduction of the liquid plugging agent. The preheating fluid may consist of hot water or steam in the case of the use of a water-soluble liquid plugging agent. The liquid plugging agent may consist of a resin which is dissolved or suspended in water as a solvent with the use of hot water or steam. Equations presented hereinafter for the use of hot water or steam, may be applied to estimate the amount of preheating and liquid selective plugging agent required to plug a substantial distance from the injection well. The liquid plugging agent may also consist of a normally high-viscosity crude oil which is solid or semisolid at the formation temperature. The preheating fluid use with the high-viscosity crude oil would preferably be a low-viscosity crude oil which would the penetrate the permeable formation and render the reservoir rocks susceptible to the setting up of the normally high-viscosity crude oil upon cooling to the formation temperature.

The formation then may be selectively plugged in the permeable zones and fractures by the introduction of the liquid plugging agent subsequent to preheating by a miscible preheating fluid which renders the formation susceptible to the setting up of the plugging agent within the permeable zones and fractures preheated. By this method further injection of fluids into the injection well will be diverted to the less permeable zones of the reservoir thereby contacting a greater vertical extent of the reservoir and rendering further reservoir fluid produced.

BRIEF DESCRIPTION OF THE DRAWINGS

The present invention is hereinafter described in further detail with particular reference to the accompanying drawings in which:

FIG. 2 depicts the temperature distribution found in the reservoir after preheating versus the radial distance from the well bore.

DETAILED DESCRIPTION OF THE INVENTION

Figure 1:
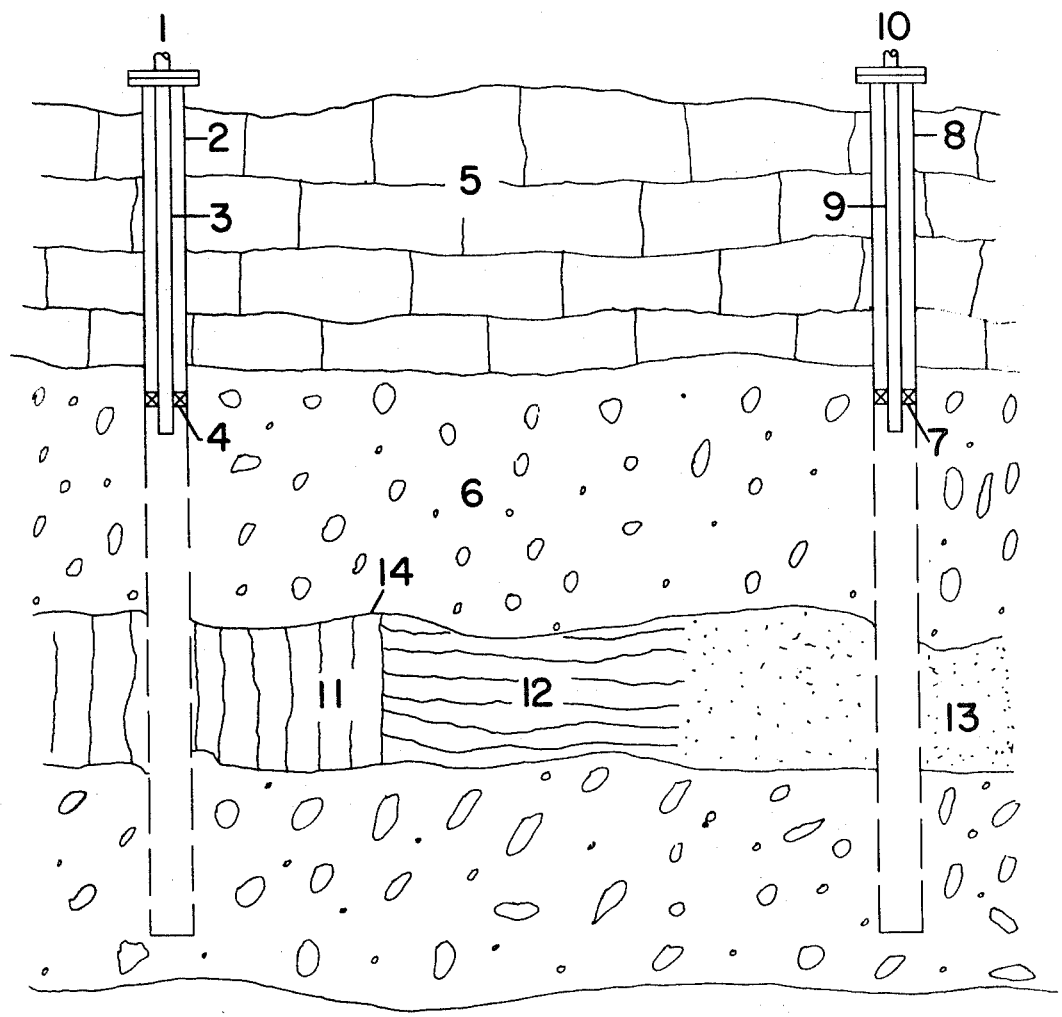
FIG. 1 represents a cross-sectional view of an oil reservoir with a zone of high permeability shown therein and a method for applying the process of the present invention to the high permeability zone.

The present invention relates to a unique method of controlled selective plugging of a natural hydrocarbon reservoir a substantial distance from the treated well bore. Plugging is accomplished by injecting a hot fluid into the more permeable zones of the hydrocarbon reservoir. The liquid plugging agent sets up as it cools into a gel or solid, or increases greatly in viscosity. The hot plugging agent cools in a reservoir due to the heat lost to the reservoir rock in the permeable strata and to the adjacent strata. The plugging agent sets up into an impermeable barrier so that further injection fluid is diverted to other strata of the reservoir. The invention involves the preheating of the reservoir by injecting a hot fluid into the permeable zone ahead of the plugging fluid. It has been found that if the reservoir is not preheated prior to the injection of the plugging agent the plug forms immediately adjacent to the well bore and inhibits further plugging of the permeable streak outward from the well bore so that the majority of the reservoir is left permeable for further fluid invasion and channeling.

It has been found by using a preheating fluid which is miscible with the liquid plugging agent that not only is the reservoir raised to a temperature which will accept the liquid plugging agent, but also conditions the reservoir rock within the permeable streak so as to be susceptible to liquid setup and adherence by the liquid plugging agent as it solidifies or becomes more viscous. Therefore, the liquid preheating fluid has a dual purpose, that is to heat the formation and also to render the formation susceptible to the liquid plugging agent. Thus, after the reservoir has been preheated by the miscible preheating fluid, subsequent introduction of liquid plugging agent would drive the preheating fluid further into the reservoir, thereby allowing the liquid plugging agent to always contact the highest temperature portion of the reservoir. The liquid plugging agent would traverse the reservoir until the leading edge thereof contacts the temperature at which the liquid plugging agent beings to solidify. Therefore, the preheating fluid is first introduced so that a given distance from the well bore will have a temperature at or greater than that at which the liquid plugging agent solidifies so that the subsequent introduction of liquid plugging agent will be able to traverse that portion of the reservoir desired for plugging.

A preferred embodiment of this invention involves the injection of a controlled amount of hot water or steam and use of a water-soluble liquid plugging agent. However, this invention is not limited to the use of water or steam as a preheating fluid. Any convenient preheating fluid which is compatible or miscible with the water-soluble plugging solution and which will render the reservoir rocks susceptible to setup by the plugging solution or solidification may be used herein. The injection of the water-soluble liquid plugging agent solution involves the injection of an aqueous solution which has a low viscosity when hot but which increases greatly in viscosity or sets up into a solid or semisolid at temperature approaching reservoir temperature. A number of materials dissolve in water and yield a solution which has a relatively large dependence of viscosity on temperature. Water-soluble resins are preferred, although there are other materials which may be used which do not depart from the spirit of the invention. Examples of the water-soluble resins which may be used include polyacrylamides such as "AP-30" and "Separan" both produced by the Dow Chemical Co.; polyvinyl alcohol for example "Elvanol" produced by the DuPont Corporation; carboxymethylcellulose such as "Hercules CMC" produced by the Hercules Powder Co.; and other water-soluble polymers such as starch. The viscosity of the solutions of these resins is changeable with temperature and is sensitive to concentration and other factors such as pH and various additives. Solutions of these resins are usually non-Newtonian fluids, therefore, viscosity may depend upon rate of flow.

The plugging material used and the concentration and additives required should be selected after laboratory tests have been completed which are designed to duplicate the conditions of the given reservoirs as closely as possible. Therefore, one would obtain a core sample, from the reservoir, of the reservoir rock to be selectively plugged. This core sample is utilized in any number of analytical schemes by which the preheating fluid may be passed through the core sample followed by the liquid plugging agent to determine the plugging ability of the plugging agent. Therefore, with the above resins, hot water or steam would be introduced into the core to preheat the core to a temperature above that of the reservoir formation. The liquid plugging material is then injected into the core to a predetermined distance and allowed to cool. Subsequent introduction of an injection fluid, generally water, would be made to see the effectiveness of the selective plugging technique. Therefore, the experimenter may select that plugging material and the amount of preheating required to establish the selected plug and form the necessary coherence of the selected plug to the formation material.

Some reservoirs may make it desirable to use a material which sets up into a solid or gel when cooled. Materials exhibiting this property when dissolved in water include the natural gums and products such as "Kelgum" produced by the Kelco Co. which is a liquid solution when hot, but forms a gel when cooled below about 120° F., and a polyvinyl alcohol, for example "Elvanol," produced by DuPont Corp. which with certain additives forms a gel when cooled. Therefore the water soluble resins may be used either to set up a highly viscous impermeable zone or an actual solid impermeable zone within the permeable streak treated.

When hot water is used as the preheating fluid, plugging may be accomplished by injecting a hot aqueous solution. It is then possible to calculate the approximate injection time required for the most beneficial effects. Two critical factors involved are the length of time the hot water must be injected for preheating, and the desired radius to be plugged from the well bore. Therefore, one must preheat the reservoir to some temperature over and above the solidification temperature of the plugging material so that as the formation cools after preheating, enough heat is provided so that the liquid plugging agent may reach the necessary distance from the injection well before the reservoir temperature reaches the solidification temperature of the liquid plugging agent. Another variable which must be determined is the minimum temperature below which the plugging solution becomes too viscous to flow. Knowing these and other variables; the necessary injection times for preheating fluid may be estimated by use of the following equation:

$$t_w = \frac{Ar_p^2}{B}\left[\frac{Ar_p^2}{4\theta x^2} + 1\right] - t_p$$

The variables A, B, $\theta$, x and $t_p$ being derived from the equations:

$$A = (4.27)\frac{4\pi K}{h\rho_w C_w Q}$$

$$B = (24)\frac{4K}{h^2 \rho_1 C_1}$$

$$\theta = \frac{\rho_1 C_1}{\rho_2 C_2}$$

$$\rho_1 C_1 = (1-\phi)\rho_r C_r + \phi(1-S_{or})\rho_w C_w + \phi S_{or}\rho_o C_o$$

$$erfc(x) = \frac{T_p - T_r}{T_i - T_r}$$

$$t_p = \frac{\pi h \phi (1 - S_{or} - S_{wc})r_p^2}{5.61Q}$$

and where: $t_w$ is the length of time hot water must be injected for reservoir preheating, days; $t_p$ is the length of time plugging solution must be injected to plug to a given radius, $r_p$, days; $r_p$ is the radial distance from the injection well bore within which the plug will exist after cooling, ft.; $T_p$ is the temperature below which a plug begins to form, ° F.; $T_i$ is the temperature of injected water and plugging solution at the sand face, ° F.; $T_r$ is the ambient reservoir temperature, ° F.; $Q$ is the injection rate, bbl./day; $h$ is the estimated thickness of stratum to be plugged, ft.; $K$ is the thermal conductivity of the adjacent strata, Btu/(hr.-ft.-° F.); $\rho$ is the density, lb./ft.$^3$; $C$ is the heat capacity, Btu./(lb.-° F.); $\Phi$ is the porosity; $S_{or}$ is the residual oil saturation; $S_{wc}$ is the connate water saturation; 1 is the subscript to denote the stratum; 2 is the subscript to denote the adjacent strata; $r$ is the subscript to denote the rock; $o$ is the subscript to denote the oil; and $w$ is the subscript to denote the water. The time required for hot water injection is calculated by solving the various equations for $A$, $B$, $\theta x$ (derived from a table of error functions) and $t_p$ and substituting these variables into the equation for $t_w$.

An example of the application of the present invention would be to selectively plug for a radius 50 ft. from the well bore a 1-foot permeable zone with "Kelgum." The various physical data required for the calculation are: $T_p$ of 120° F.; $T_i$ of 200°F; $r_p$ of 50 ft.; $T_r$ of 100° F.; $h$ of 1.0 ft.; $Q$ of 500 bbl./day; $\Phi$ of 0.25; $K$ of 1.3 Btu./(hr.-ft.-° F.); $S_{or}$ of 0.3; $S_{wc}$ of 0.2; $C_r$ of 0.2 Btu./(lb.-° F.); $C_w$ of 1; $C_o$ of 0.5; $\rho_r$ of 165 lb./ft.$^3$; $\rho_w$ of 62.4 lb./ft.$^3$; $\rho_o$ of 50 lb./ft.$^3$. Using these values it is possible to calculate the time required to inject hot water for preheating. This time is calculated to be approximately 3.8 days. The time required to inject the plugging solution is calculated to be about 0.35 days. Within a total time of 4.2 days, the plugging solution should be present in the 1-foot-thick strata from the well bore out to the radius of 50 feet. Reservoir temperature will range from 200° F. at the well bore to 120° F. at the radius of 50 feet. If the injection of hot fluid is stopped at this time, the reservoir will cool rapidly so that the plug will form.

Another preferred embodiment of the invention is to use as the liquid plugging agent a highly viscous oil which normally is solid or semisolid at the formation temperature. Therefore, the preheating fluid to render the formations susceptible to the solidification and adherence of the semisolid or solid viscous oil preferably is a low-viscosity crude oil which is heated to a temperature above that of the formation. Many other plugging agents and preheating solutions are available which have not been mentioned herein. Regardless of what the agent is, it is still a necessity to preheat the formation and to have the preheating fluid miscible with the liquid plugging agent so that the characteristics of the present invention are achieved.

To more fully understand the present invention referral is made to FIG. 1, in which the injection well 1 consisting of casing 2 and tubing string 3 penetrates earth 5 into oil reservoir 6. Injection well 1 is isolated at reservoir 6 by packer 4 so that fluid may be introduced through the tubing string 3, into reservoir 6. Reservoir 6 is further penetrated by production well 10 consisting of casing 8 and tubing string 9 which is isolated in the vicinity of the top of the oil reservoir 6 by packer 7. Therefore, during ordinary operations the injection of injection fluid into injection well 1 is allowed to all of reservoir 6 and therefore produced over all of the well bore of production well 10. Under these operations, however, the majority of the fluid will pass through the more permeable zone 14 so that an ineffective displacement drive is achieved. To correct the situation a preheating fluid is introduced through tubing 3, in injection well 1, into permeable zone 14, so as to preheat permeable zone 14 to a temperature above which a liquid selective plugging fluid solidifies. After the given distance desired for selective plugging is achieved and preheated above the selective plugging solidification temperature, a selective plugging material is introduced into reservoir 6 with the majority flowing into permeable zone 14. Thereafter, the selective plug introduced traverses permeable zone 14 from injection well 1 towards the production well 10 until the leading front of the selective plugging agent begins to solidify. The introduction of the selective plugging agent is then ceased and the permeable zone 14 is allowed to cool. Upon accomplishment of the solidification of all the selective plugging agent one finds an impermeable zone 11 formed from the injection well bore to a considerable distance into the oil reservoir 6, the zone 12 of preheating fluid which has been pushed outwardly by a selective plugging agent formed in zone 11 and an untreated zone 13 which still remains of the high permeability of the initial zone but is isolated completely from the injection well and will not deter further fluid displacement of the oil in reservoir 6. Therefore, the permeable zone 14 is selectively plugged by preheating and treated so that the selective plugging agent formed in section 11 will adhere to the surface of the formation due to the miscibility of the preheating fluid and the selective plugging fluid and further enhance displacement of the reservoir.

The temperature distribution formed by the preheating fluid and the miscible selective plugging agent is depicted in FIG. 2. FIG. 2 shows the temperature distribution in the reservoir versus radial distance from the injection well bore. Therefore, one can see that the temperature of the reservoir is normally equal at all distances in the reservoir from the well bore but with introduction of preheating fluid the temperature becomes equal to the temperature of the preheating fluid at the wellbore, $T_i$ decreases to a point some distance from the well bore at which the temperature again returns to the temperature of the reservoir, $T_r$. In between $T_i$ and $T_r$ is found the temperature $T_p$ at which the selective plugging agent solidifies at distance $r_p$.

The possibility exists that more of the reservoir than desired will be plugged. If channeling is evident from early breakthrough of the injection fluid at the producing well, it can be expected that most of the injected hot fluid will enter the channel. However, some fluid will enter adjacent permeable strata and may cause undesirable plugging in these zones which can be avoided in various ways. For instance, if the location of the channel in the well bore is known, it can be isolated with packers and hot fluid injected only into this interval. If the location is not known, injection of hot plugging solution can be followed by additional hot fluid which does not contain the plugging agent. This would tend to move the plug away from the well bore and remove the possibility of any plug at the well bore where injectivity could be hindered.

The possible uses and ramifications of the present invention are not restricted to injection wells and in the same manner a production well exhibiting a high ratio of displacing fluid to oil might react beneficially by the selective plugging process described herein. It is also conceivable that both injection and production wells might be treated as outlined previously.

The present invention, therefore, provides a highly significant method for the recovery of oil from partially depleted reservoirs. The improved displacement afforded after application of the selective plugging process described herein may render previously unsuitable reservoirs, which had early breakthrough in the production well bore, to be treated and further displacement therefrom accomplished. The recovery of oil from a reservoir which had been abandoned after early secondary recovery problems due to channeling is therefore rendered possible by this process so that the total oil recovery therefrom is enhanced. In addition, since the selective plug is a permanent installation, tertiary recovery techniques may be applied to the reservoir without fear of renewed channeling or permeable zone breakthrough.

The invention has been described herein with reference to particular embodiments and aspects thereof. It will be appreciated by those skilled in the art that the various changes and modifications may be made, however, without departing from the scope of the invention.

Therefore, I claim:

1. In a method of selectively plugging a permeable zone of a formation penetrated by a well comprising injecting into said formation, at a temperature above a first temperature which is greater than that of the said formation, a liquid plugging agent which is normally a solid or semisolid at the first temperature, and which is normally a liquid at temperatures above the first temperature, the improvement which comprises preheating the permeable zones of the formation to be selectively plugged with a preheating fluid having a temperature greater than that of the first temperature prior to the introduction of the liquid plugging agent and which is miscible with the liquid plugging agent.

2. The method of claim 1 in which the liquid plugging agent is a water-soluble resin and the preheating fluid is hot water.

3. The method of claim 2 in which the hot water is introduced for approximately the time given by:

$$t_w = \frac{Ar_p^2}{B}\left[\frac{Ar_p^2}{4\theta x^2}+1\right] - t_p$$

where the variables $A$, $r_p$, $B$, $\theta$, $x$ and $t_p$ are defined as in the specification.

4. The method of claim 3 in which the liquid plugging agent is introduced for approximately the time given by:

$$t_p = \frac{\pi h \phi (1 - S_{or} - S_{wo}) r_p^2}{5.61 Q}$$

where the variables $h$, $\Phi$, $S_{or}$, $S_{wc}$, $r_p$ and $Q$ are defined as in the specification.

5. The method of claim 1 in which the liquid plugging agent is a water-soluble resin and the preheating fluid is steam.

6. The method of claim 1 in which the liquid plugging agent is a normally high-viscosity crude oil which is solid or semisolid at the formation temperature and the preheating fluid is a low viscosity crude oil.